April 8, 1969   G. D. PERKINS ET AL   3,437,389
CONTAINER FOR FISHING TACKLE OR THE LIKE
Filed Aug. 5, 1967   Sheet 1 of 3

INVENTORS
GEORGE D. PERKINS
DAVID E. WORKMAN
JOSEPH W. KNEIER

Frank H Thomson

ATTORNEY

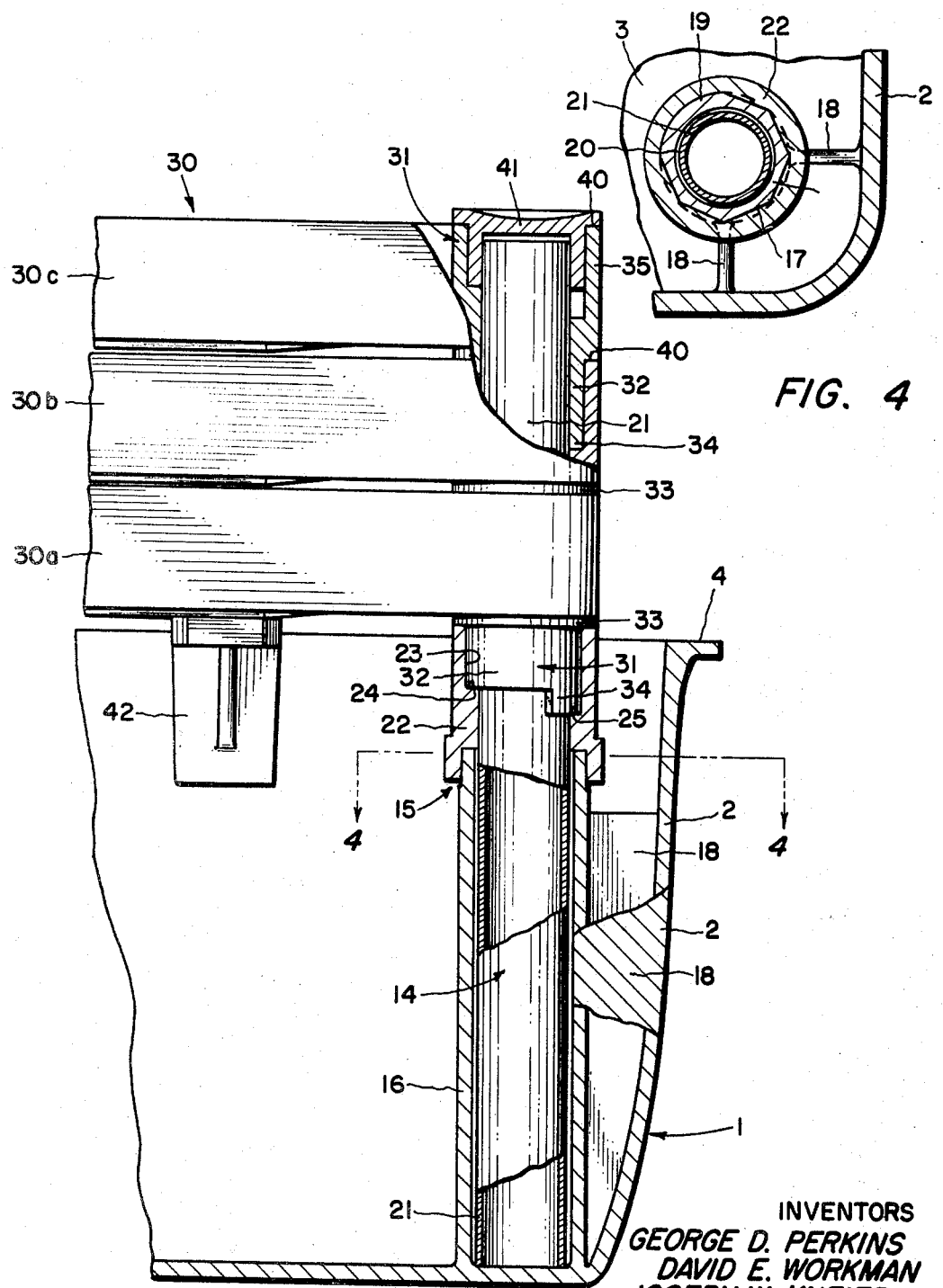

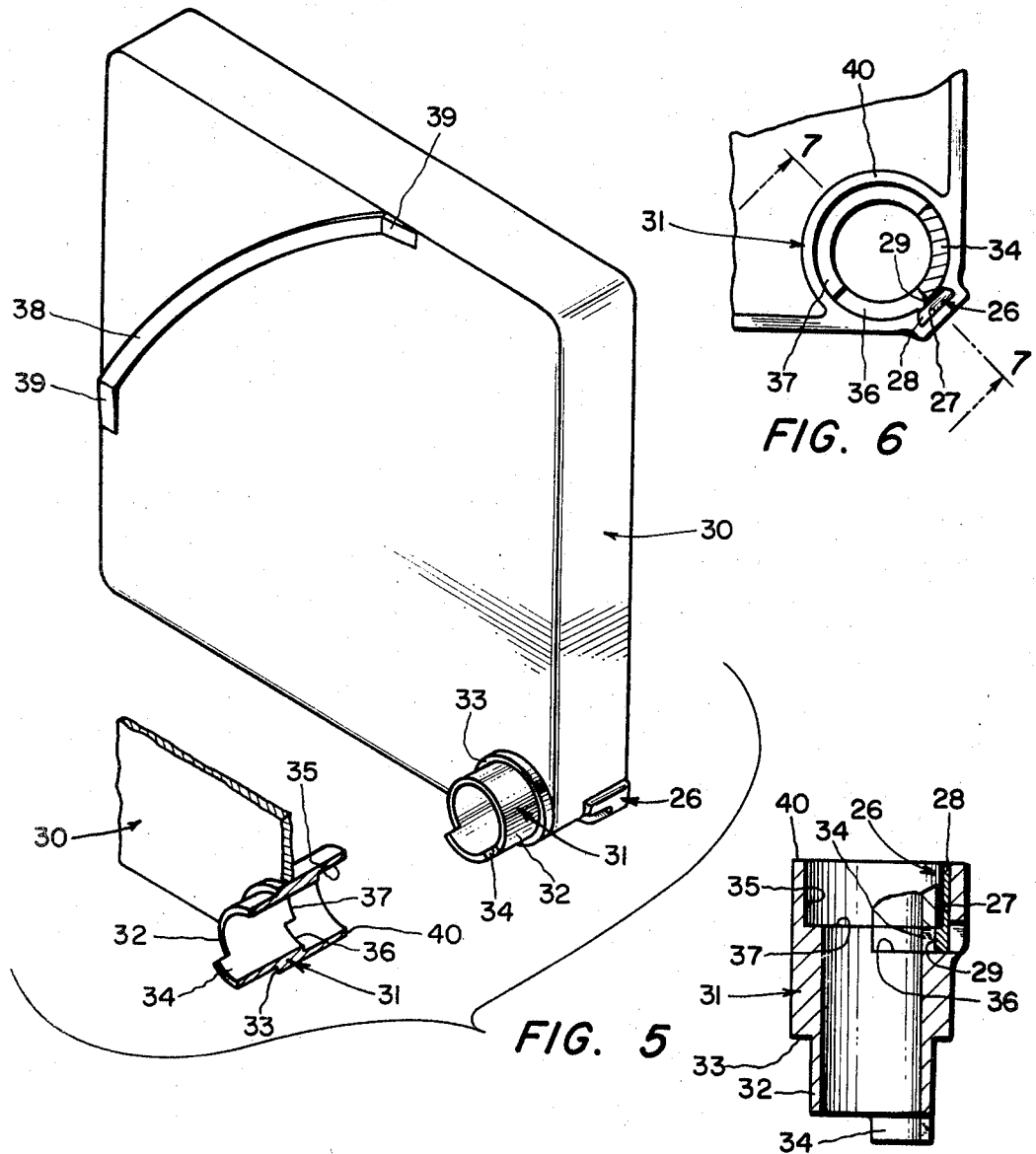

United States Patent Office 3,437,389
Patented Apr. 8, 1969

3,437,389
CONTAINER FOR FISHING TACKLE OR THE LIKE
George D. Perkins and David E. Workman, Pasadena, Calif., and Joseph W. Kneier, Chesterland, Ohio, assignors to Pendleton Tool Industries, Inc., Los Angeles, Calif., a corporation of Delaware
Filed Aug. 3, 1967, Ser. No. 658,216
Int. Cl. A47b 53/00, 77/16; A45c 5/12
U.S. Cl. 312—202                    8 Claims

ABSTRACT OF THE DISCLOSURE

A container for fishing tackle which includes a conventional box made up of a pair of box halves connected to each other by a hinge to allow the box to be opened and closed. A pair of socket members are each positioned in a corner of the container and a tubular support post is mounted in the sockets. A plurality of trays are mounted in a stacked or superposed arrangement on these posts so that the trays are positioned above the lower half of the container. The trays swivel or pivot on these posts when the container is open and there are means to limit the amount of pivoting of each tray relative to the tray immediately below to 90° so that the trays can be fanned. This tray arrangement permits free access to the bottom half of the container.

Background of the invention

This invention relates to containers and in particular to a container which can be used for carrying both large and small articles such as fishing tackle or hand tools.

Some prior fishing tackle and utility boxes contained trays which are linked together so that when the top of the box is open, the trays will swing upwardly to allow some access to the bottom half of the box. The linked trays are used to store small articles such as fishing lures, hooks and the like while the bottom half of the box is used to store large articles such as fishing reels. Linked tray boxes have disadvantages. In general, the linked tray arrangement has the disadvantage that it does not allow complete access to the lower half of the box. There is no access to the lower half of the box until the box is completely open. Even when completely open the linked tray arrangement masks visibility in the lower half of the box. The linked tray arrangement does not lend itself to complete plastic construction as the linkages must be of metal construction. This reduces the noncorrosiveness of the entire container which can be particularly important in tackle boxes. Assembly of the linked trays is often expensive increasing the cost of the entire unit.

Some fishing tackle boxes use a hip roof configuration where the hip roof opens along its center line to reveal linked trays. The split top hip roof has the problem that it is relatively weak. If made of molded plastic, it usually requires additional support such as a metal rim. The split roof has the additional disadvantage that it is difficult to make water tight without the addition of seals. A water tight arrangement is essential for fishing tackle boxes.

Summary

It is therefore the principal object of this invention to provide a container which is useful for carrying both large and small articles and which permits complete accessibility to the entire storage portion of the container.

It is another object of this invention to provide a container which lends itself to virtually complete plastic construction.

In general, the foregoing objects are carried out by providing a container having a top, bottom, and sidewalls comprising a pair of box halves each having sidewalls and a bottom. Hinge means pivotally connect the edge of one side of each box half so that the container can be swung between open and closed positions. There is at least one tray dimensioned to be received by one of the box halves when the container is closed. Pivot means connects the tray to one of the box halves for permitting rotation of the tray in a plane parallel to the bottom of the container.

Brief description of the drawings

The foregoing and other objects will become apparent from the following description and drawings wherein:

FIG. 3 is a sectional view of a portion of this invention;

FIG. 4 is a sectional view taken on the lines 4—4 of FIG. 3 looking in the direction of the arrows;

FIG. 5 is an exploded view of a portion of this invention;

FIG. 6 is a top plan view of a portion of this invention; and

FIG. 7 is a sectional view taken on the lines 7—7 of FIG. 6.

Description of the preferred embodiment

Figure 1:
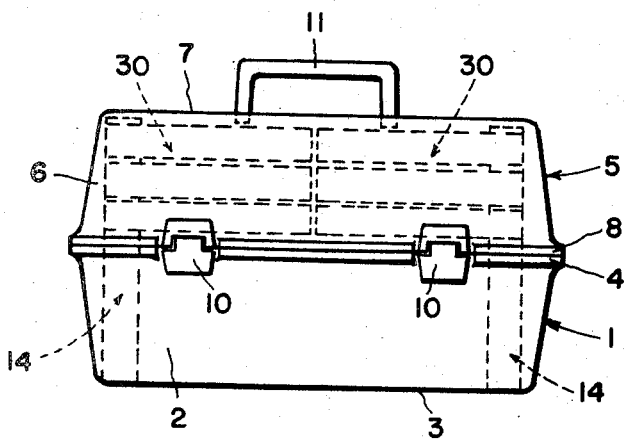
FIG. 1 is a plan view of a fishing tackle box in accordance with this invention.

The utility container or fishing tackle box of this invention includes a pair of box halves generally indicated at 1 and 5. There is a first box half having sidewalls 2 and a bottom 3. An edge portion 4 extends around the entire box half. A second box half includes sidewalls 6, a bottom 7 and an edge portion 8 extending around the entire box half. The bottom 3 of the first box half constitutes the bottom of the container and the bottom 7 of the second box half serves as the top of the container, as is clearly shown in FIG. 1. The edge portions of the two box halves are connected by a hinge 9 so that the box may be swung open and closed. A pair of latch means 10 are provided for keeping the container closed. A carrying handle 11 is provided in the top of box 7. The edge portions 4 and 8 mate when the container is closed to provide a water tight seal.

Tray support means are positioned in two corners of the first or lower box half along the side adjacent the hinge 9. The tray support means are generally indicated at 14 and include a pair of socket means 15 preferably of molded tubular construction having a central passage 20 with each of the socket means mounted in a corner of the first box half. A socket means, generally indicated at 15, includes a tubular socket 16. The tubular socket 16 may be molded as an integral part of the lower or first box half 1. The tubular socket 16 is connected to the lower box half sidewall 2 by means of webs 18 which are molded with the tubular socket 16 and box half 1. If desired, a tongue and groove arrangement may be used to connect a separately molded socket means to the separately molded box half 1. The upper end of the tubular socket 16 is provided with a generally hex shaped portion 17. A separate tubular member 22 is provided and mounted on the upper or hex end of the tubular socket 16. The tubular member 22 is provided with a hex portion which mates with the hex portion 17. Rotation of the member 22 relative to the member 16 is thereby prevented. A keying portion 19 is provided in the hex 17 to insure proper alignment of the member 22. The tubular portions 16 and 22 constitute the socket means and together extend approximately to the edge 4 of the lower box half 1. If desired, the two members 16 and 22 may be molded as a single piece.

The tubular portion 22 and thus the socket means is provided with a reduced inside diameter portion 23. This reduced portion is deeper for one half of the member 22 than for the other half to thereby provide a pair of shoulders 24 and 25, at different levels, each extending 180°.

A support post 21 is slidably received in the passage 20 of the socket means 15. The post 21 is preferably tubular and extends from the bottom of the socket means to a height above the socket means 15. The post 21 is preferably metal to provide ample support for article carrying trays. This post may be the only metallic portion of the container with the remainder being molded plastic.

A plurality of article carrying trays 30 are carried on the support post 21. Each of these article carrying trays is similar to that shown in FIG. 5 and includes a bottom and sidewalls. A plurality of dividers (not shown) may be provided to divide the trays 30 into small compartments. Each tray has a hole in one of its corners with a substantially cylindrical tubular member 31 extending on each side of the bottom of the tray around the corner hole. The bottom of this cylindrical member 31 has a reduced diameter portion 32 to provide a shoulder 33. The reduced diameter portion is provided with an elongated portion or ear 34 extending approximately 90° around the cylindrical member 31. The upper portion of the cylindrical member 31 is provided with portion 35 having a reduced internal diameter. One half of the reduced internal diameter portion is deeper than the other half to provide a pair of shoulders 36 and 37 at different levels with each extending approximately 180° around the inside of the cylindrical member 31. The bottom of the tray is provided with an arcuate raised portion 38 having tapered ends 39.

Figure 2:
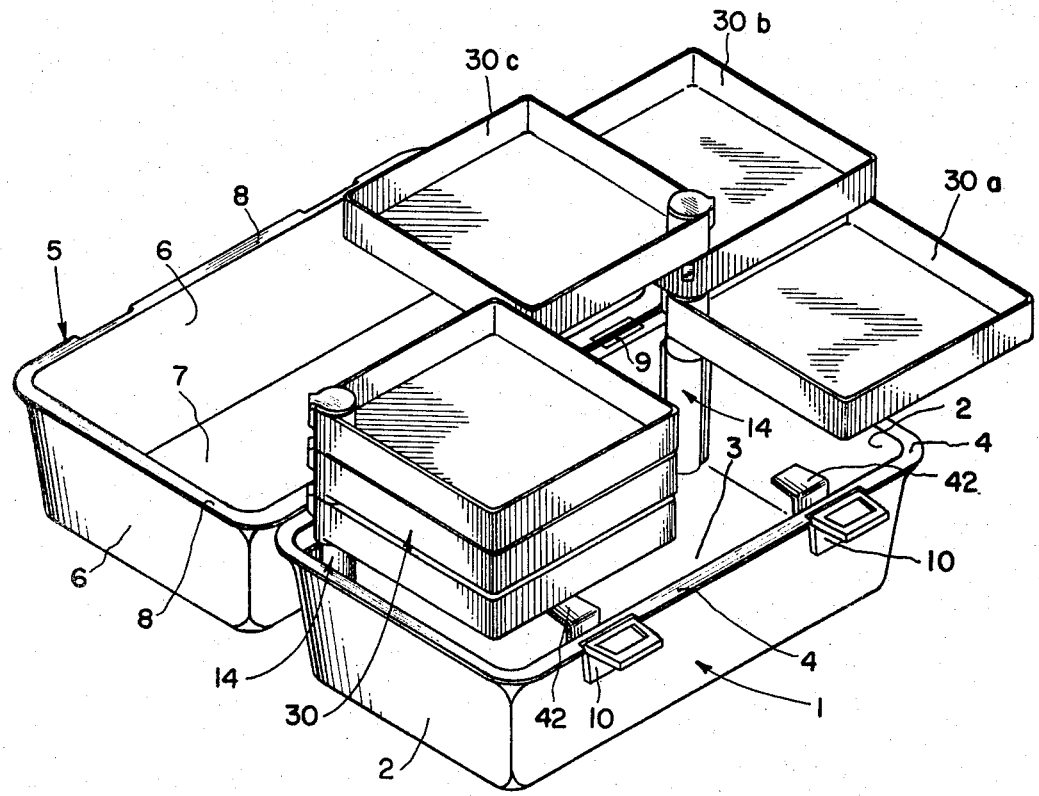
FIG. 2 is a perspective view of the tackle box of this invention.

The trays 30 are slid over post 21 so that the post 21 slides through the cylindrical member 31 in the corner of each tray. The trays are mounted in a stacked or superposed arrangement, as clearly shown in FIGS. 1 to 3. The first tray 30a is placed on the post 21 so that reduced diameter portion 32 fits into reduced internal diameter portion 23 and ear 34 fits into the area bounded by shoulder 25. Because ear 34 extends 90° and the area bounded by shoulder 25 extends 180°, the rotation of the first tray is limited to 90° relative to the container. The next tray 30b is slid over post 21 so that the reduced diameter 32 fits into reduced internal diameter portion 35. Shoulder 33 of one tray rests on the upper end 40 of the tray immediately below and ear 34 fits within the area formed by shoulder 36. The reduced diameter portion 32 rides on shoulder 37. The rotation of the second tray relative to the first tray is limited to 90° by the ear 34 moving within the area bounded by the shoulder 36. However, when the first tray is rotated, the second tray will rotate with it. Thus, the trays are able to be fanned as clearly shown in FIG. 2. A third tray 30c or more may be added as desired and a cap 41 is placed over the end of the post 21.

The trays may be rotated between two extreme positions. The first extreme position permits the container to be closed (FIG. 1) and the second extreme position permits substantially free access to the lower box half. The trays immediately adjacent the edge of the lower box half can rotate 90° relative to the container; the amount of rotation being limited by the ear 34 riding in the cut out portion 22. Because the trays are interconnected by means of the members 31, the higher trays will also be rotated 90°. The next tray can then be rotated an additional 90° relative to the first tray. This permits substantially free access to the first tray. A third tray can in turn be rotated an additional 90° relative to the second tray or 180° relative to the first tray. The highest tray can be rotated independently of the other trays within the 90° limitation. Since the trays can be fanned, substantially free access to all of the trays is permitted. The important feature is that each tray can rotate only 90° relative to the tray immediately below it and thus the trays may be fanned to permit substantially free access to the lower box half and to each of the article carrying trays. The trays are further separated by the arcuate portion 38 to make independent rotations easier. The tapered portions 39 aid in the rotation. Support means 42 are provided in a sidewall of the lower box half. These supports insure that the article carrying trays will be adequately supported when the container is closed.

Detent means 26 are provided in each cylindrical member 31 and in the tubular portion 22 of the socket means 15. The cylindrical portions 32 and the portion 22 are each provided with a recess 27. A detent 28 having a tip 29 is received by the recess 27. The tip 29 engages an edge of the ear 34 to hold the tray 30 in one of its extreme positions. When a small amount of force is applied to the tray 30 to rotate the tray, the ear 34 pushes the tip 29 inwardly to permit rotation of the tray to the other extreme position where the tip 29 springs outwardly to hold the tray in that position. Thus the trays will remain in either extreme position until some force is applied. The detent 28 should be designed and made from a material which permits it to be moved inwardly away from the ear 34.

It is readily apparent that a novel fishing tackle box has been provided. Small articles such as lures, hooks and weights can be carried in the small article carrying trays 30. Large articles such as fishing reels can be carried in the lower box half. The pivoting trays provide easy access to the lower box half. Each tray can be seen individually when they are fanned. This invention permits construction of molded plastic with virtually the only metal parts being the posts 21. It eliminates the necessity of additional supports and seals.

We claim:
1. A container having a top, bottom and sidewalls comprising:
 a pair of box halves each having sidewalls and a bottom;
 hinge means pivotally connecting an edge of one sidewall of each box half so that the container can swing between open and closed positions;
 a plurality of trays each pivotally connected to the same box half in a stacked arrangement and dimensioned to be received by one of said box halves when said container is closed;
 pivot means connecting said trays to one of said box halves positioned to permit rotation of said trays in a plane parallel to the bottom of the container between a position which permits said container to be closed and a position which permits substantially free access to at least a portion of the box half to which the trays are connected; and
 means for limiting the amount of rotation of each tray relative to the tray immediately below to 90° so that said trays can be fanned.

2. The container of claim 1 further comprising additional support means mounted on a sidewall of one of said box halves for supporting said trays when said trays are in a position which permits the container to be closed.

3. A container comprising:
 first and second box halves each having sidewalls and a bottom;
 hinge means pivotally connecting an edge of one side of each box half so that the container can be swung between open and closed positions whereby the bottom of the first box half serves as the bottom of the container and the bottom of the second box half serves as the top of the container;
 support means positioned in the first box half; and
 at least one tray mounted on said support means for pivotal movement in a plane parallel to the container bottom between one extreme position where it can be substantially completely received by said second box half when said container is closed and a second extreme position which permits substantially free access to at least a portion of said first box half when said container is open.

4. The container of claim 3 wherein said support means comprises a pair of socket means each mounted in a corner of said first box half and a support member mounted in each of said socket means and projecting above the edge of said first box half; said tray means includes at least one tray pivotally mounted on each of said support members above the edge of said first box half.

5. The container of claim 4 wherein there are a plurality of trays mounted in a stacked arrangement on each support member and further comprising means for limiting the amount of pivotal movement of each tray relative to the tray immediately below to 90° so that said trays can be fanned.

6. The container of claim 5 further comprising latch means for securing said first and second box halves together so that said container is closed.

7. The container of claim 5 wherein said support members are tubular members which fit into said socket means and said trays slide over said tubular members and further comprising a cap covering the top of said tubular members.

8. The container of claim 5 further comprising detent means for selectively holding each tray in its extreme position.

References Cited

UNITED STATES PATENTS

| | | | |
|---|---|---|---|
| 270,697 | 1/1883 | Ransom | 190—32 |
| 477,795 | 6/1892 | Dwyer | 190—32 |
| 1,600,830 | 9/1926 | Lewis | 190—51 |
| 2,196,024 | 4/1940 | North | 190—32 |
| 2,767,502 | 10/1956 | Reynolds | 206—16 X |
| 2,955,892 | 10/1960 | Pulaski et al. | 312—326 X |
| 3,047,348 | 7/1962 | Hickox | 312—202 |
| 3,188,157 | 6/1965 | Rand | 312—202 |

JAMES T. McCALL, *Primary Examiner.*

U.S. Cl. X.R.

190—32; 312—273